US009954262B2

(12) United States Patent
Koido et al.

(10) Patent No.: US 9,954,262 B2
(45) Date of Patent: Apr. 24, 2018

(54) AIR SECONDARY BATTERY INCLUDING CATHODE HAVING TRAP PORTION

(71) Applicants: HONDA MOTOR CO., LTD., Tokyo (JP); Massachusetts Institute of Technology, Cambridge, MA (US)

(72) Inventors: Tetsuya Koido, Wako (JP); Akihiro Kushima, Arlington, MA (US); Yoshiya Fujiwara, Wako (JP); Ju Li, Weston, MA (US)

(73) Assignees: HONDA MOTOR CO., LTD., Tokyo (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 255 days.

(21) Appl. No.: 14/835,033

(22) Filed: Aug. 25, 2015

(65) Prior Publication Data

US 2016/0064787 A1   Mar. 3, 2016

Related U.S. Application Data

(60) Provisional application No. 62/043,656, filed on Aug. 29, 2014.

(51) Int. Cl.
*H01M 4/86* (2006.01)
*H01M 4/38* (2006.01)
(Continued)

(52) U.S. Cl.
CPC .......... *H01M 12/08* (2013.01); *H01M 4/382* (2013.01); *H01M 4/583* (2013.01); *H01M 4/861* (2013.01);
(Continued)

(58) Field of Classification Search
CPC .... H01M 4/8626; H01M 4/382; H01M 4/861; H01M 4/8657; H01M 4/583; H01M 12/08
(Continued)

(56) References Cited

U.S. PATENT DOCUMENTS 6,855,378 B1 * 2/2005 Narang ................ H01G 4/228
257/E21.174
8,632,920 B2  1/2014 Nakanishi et al.
(Continued)

FOREIGN PATENT DOCUMENTS

JP    2010-257839    11/2010

OTHER PUBLICATIONS

Bruce, et al., "Li—O2 and Li—S batteries with high energy storage", Nature Materials, Jan. 2012, pp. 19-29, vol. 11, No. 1.
(Continued)

*Primary Examiner* — Sean P Cullen
(74) *Attorney, Agent, or Firm* — Rankin, Hill & Clark LLP

(57) ABSTRACT

An air secondary battery has a cathode to which an oxygen-containing gas is supplied, an anode containing an active metal material, and an electrolyte interposed between the cathode and the anode. In a discharge process, metal ions are generated from the active metal material, transferred through the electrolyte, and then reacted and bonded with oxygen molecules in the oxygen-containing gas on the cathode. Thus, the oxygen is reduced to generate a metal oxide. The cathode has a trap portion for confining the metal oxide. For example, the cathode has a first cathode layer and a second cathode layer having different average pore diameters. The first cathode layer located adjacent to the electrolyte and having a smaller average pore diameter acts as the trap portion.

12 Claims, 14 Drawing Sheets

(51) Int. Cl.
*H01M 4/583* (2010.01)
*H01M 12/08* (2006.01)
*H01M 4/02* (2006.01)

(52) U.S. Cl.
CPC ....... *H01M 4/8626* (2013.01); *H01M 4/8657* (2013.01); *H01M 2004/027* (2013.01); *H01M 2004/8689* (2013.01); *Y02E 60/128* (2013.01)

(58) Field of Classification Search
USPC .......................................... 429/405, 402, 403
See application file for complete search history.

(56) References Cited

U.S. PATENT DOCUMENTS

| | | | |
|---|---|---|---|
| 2011/0200891 A1 | 8/2011 | Kotani et al. | |
| 2012/0270115 A1 | 10/2012 | Johnson | |
| 2013/0260264 A1 | 10/2013 | Shimizu et al. | |
| 2013/0260265 A1 | 10/2013 | Shimizu et al. | |
| 2013/0295471 A1 | 11/2013 | Visco et al. | |
| 2014/0045080 A1 | 2/2014 | Albertus et al. | |
| 2014/0255799 A1* | 9/2014 | Anandan | H01M 4/861 429/405 |

OTHER PUBLICATIONS

European Search Report dated Dec. 3, 2015, 9 pages.

* cited by examiner

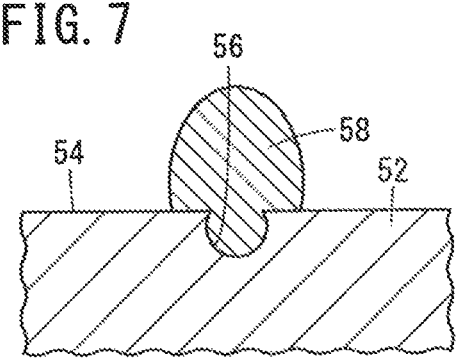

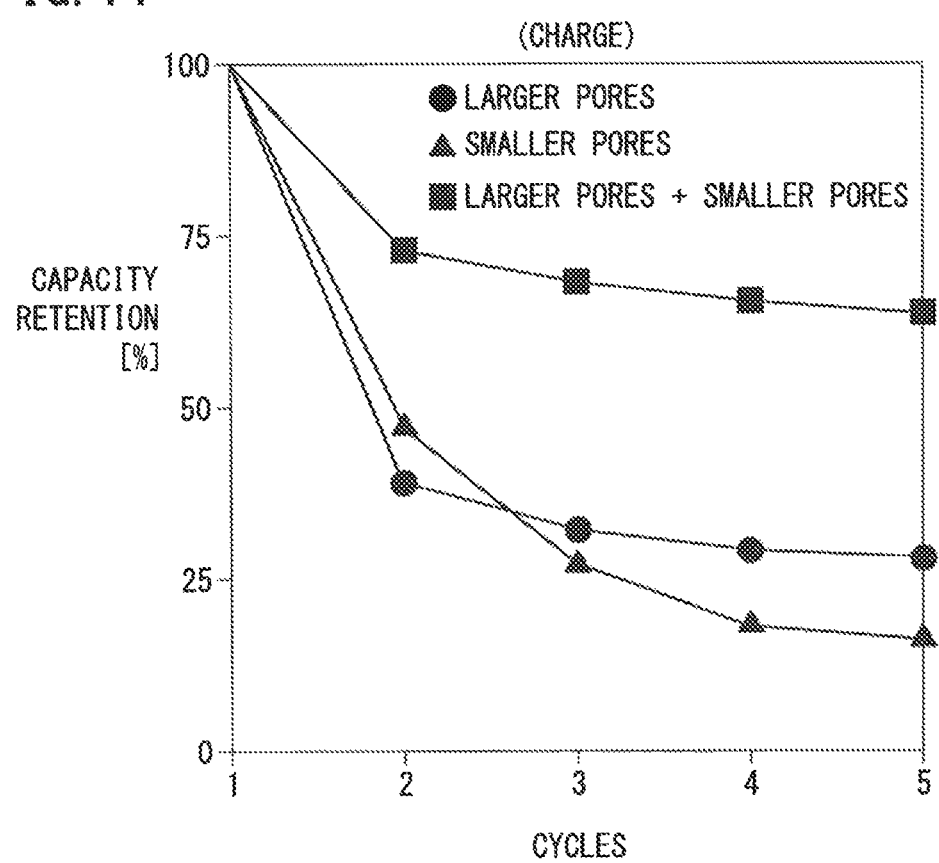

AIR SECONDARY BATTERY INCLUDING CATHODE HAVING TRAP PORTION

CROSS-REFERENCE TO RELATED APPLICATION

This application is based upon and claims the benefit of priority from U.S. Provisional Patent Application No. 62/043,656 filed on Aug. 29, 2014, the contents of which are incorporated herein by reference.

BACKGROUND OF THE INVENTION

Field of the Invention

The present invention relates to an air secondary battery and more specifically to an air secondary battery having a cathode in which a metal oxide is generated in a discharge process.

Description of the Related Art

Air batteries are electric batteries using oxygen as a cathode active material. Air primary batteries using zinc as an anode active material have been widely used, and air secondary batteries, which are rechargeable, have been studied in recent years. In terms of high energy density, using lithium as an anode active material has been attempted in the air secondary batteries. However, as described in Peter G. Bruce, et al., NATURE MATERIALS, vol. 11, no. 1, pp. 19-29 (2012), the conventional air secondary batteries are disadvantageous in that the electric capacitance (or the cyclability) tend to be deteriorated as a result of repeating the charge and discharge cycles and that the overpotential is large in the charge process.

As described in U.S. Pat. No. 8,632,920 and US Patent Application Publication No. 2011/0200891, the above disadvantages are caused because air bubbles stagnate and accumulate on the boundary between the cathode and the electrolyte while the charge and discharge cycles are repeated, whereby the cathode is covered with the air bubbles. To solve this problem, U.S. Pat. No. 8,632,920 proposes that a permeation preventing layer for preventing oxygen permeation is formed on a surface of the cathode that faces the anode.

US Patent Application Publication No. 2011/0200891 proposes a conductive porous body disposed in the cathode. The air bubbles accumulated on the boundary between the cathode and the electrolyte are diffused and removed from the boundary to an oxygen supply port through the conductive porous body.

Furthermore, Japanese Laid-Open Patent Publication No. 2010-257839 discloses an air secondary battery having a cathode wherein the cathode is formed as a stack of first and second layers each having a catalyst, and the pore diameter of the first layer is different from that of the second layer. Therefore, even when the cathode has a large thickness, an oxygen-containing gas can be sufficiently diffused in the cathode.

SUMMARY OF THE INVENTION

As is well known, in the air secondary battery, a metal oxide is generated on the cathode in the discharge process. As a result of so-called in-situ observation of a lithium-air secondary battery in the charge and discharge processes, the inventors have found that a lithium oxide generated in the discharge process is partially dropped off from the cathode in the charge process. Based on this finding, the inventors presume that the amount of the lithium oxide to be reconverted to lithium (the active metal material) in the charge process is reduced due to the detachment from the cathode. As a result, the more the discharge process and the charge process are repeated, the lower the discharge and charge capacities become. This may be true in air batteries other than the lithium-air secondary battery.

As a result of intense research in view of preventing the detachment of the metal oxide from the cathode, the present invention has been accomplished.

A principal object of the present invention is to provide an air secondary battery capable of preventing a metal oxide of an electrode reaction product from falling off from a cathode.

Another object of the present invention is to provide an air secondary battery having large charge and discharge capacities and a low overpotential.

According to an aspect of the present invention, there is provided an air secondary battery having a cathode for reducing oxygen in an oxygen-containing gas in a discharge process, an anode containing an active metal material, and an electrolyte interposed between the positive and anodes.

The cathode has a trap portion for trapping a metal oxide generated in the discharge process.

In the present invention, the trap portion is formed in the cathode. The metal oxide (the electrode reaction product), generated on the cathode in the discharge process, is trapped by the trap portion. Therefore, the metal oxide can be prevented from falling off from the cathode. Thus, the metal oxide can be retained on the cathode.

Therefore, in a charge process, even if the contact area between the metal oxide and the cathode becomes small and the metal oxide is detached, since the detached metal oxide can be trapped by the trap portion, the detached metal oxide is prevented from moving away into the electrolyte. As a result, since the electric contact between the metal oxide and the cathode can be recovered, electric contact between the metal oxide and the cathode can consequently be maintained. For the above reasons, the air secondary battery can keep sufficient charge and discharge capacities.

In addition, since the metal oxide is confined in the cathode, the electric contact between the metal oxide and the cathode can be recovered and the contact area between the metal oxide and the cathode can also be recovered in the cathode. Thus, the overpotential can be reduced. As a result of the recovery of the contact area, because electrical resistance at the contact point can be kept low, the rate of the electrode reaction can be improved. Consequently, the air secondary battery can exhibit the large discharge and charge capacities and the low overpotential, i.e. improved properties.

For example, the cathode has a first cathode layer as the trap portion in contact with the electrolyte and a second cathode layer separated from the electrolyte. In this case, the first and second cathode layers are porous bodies, and the average pore diameter of pores in the second cathode layer is larger than the average pore diameter of pores in the first cathode layer. Furthermore, the oxygen reduction reaction potential of the second cathode layer is higher than the oxygen reduction reaction potential of the first cathode layer.

In the case of using this structure, the electrode reaction for generating the metal oxide is caused and proceeds preferentially in the second cathode layer. This is because the oxygen reduction reaction potential of the second cathode layer is higher than that of the first cathode layer.

Since the average pore diameter of the first cathode layer is smaller than that of the second cathode layer, the metal oxide is hardly transferred through the first cathode layer.

As described above, in this air secondary battery, the metal oxide can be generated in the second cathode layer in the discharge process, transferred from the second cathode layer to the first cathode layer, and trapped by the pore in the first cathode layer. Thus, the first cathode layer acts as the trap portion.

As is clear from the in-situ observation, particles of the metal oxide generated in the cathode have an average particle diameter of 100 nm or more. Thus, the average pore diameter of the first cathode layer is preferably less than 100 nm. In this case, the average particle diameter of the metal oxide particles is larger than the average pore diameter of the first cathode layer, whereby the particles can be easily trapped by the first cathode layer.

The second cathode layer may be surrounded by the first cathode layer.

An insulating layer is preferably interposed between the first and second cathode layers. In this case, electron transfer in the direction from the first cathode layer to the second cathode layer or in the opposite direction is inhibited in the charge and discharge processes. Therefore, in the discharge process, the electrode reaction can be carried out more preferentially in the second cathode layer. As a result, the metal oxide particles are prevented from being generated in the first cathode layer and clogging the inner pores of the first cathode layer, so that the above advantageous effects can be further improved.

In the case of using the insulating layer, each of the first and second cathode layers may be electrically connected to a charger in the charge process. The metal oxide trapped by the first cathode layer can be reduced in this manner.

The insulating layer preferably contains a polymer material. Alternatively, the insulating layer may simply be a gap, which is formed by separating the first cathode layer from the second cathode layer by a physical distance.

In another preferred embodiment, the trap portion may be a depression or dimple continuous with the pore in the cathode. In this case, the volume of the depression is smaller than that of the pore.

In this case, for example, the metal oxide is partially introduced into the dimple. Therefore, the metal oxide can be trapped by the dimple.

In the dimple, an opening continuous with the pore is preferably smaller than an inner portion. In this case, the part of the metal oxide introduced into the dimple cannot easily come out from the dimple. Thus, a significant anchor effect can be achieved.

In the above structure, the active metal material in the anode preferably contains lithium, whereby the energy density of the air secondary battery can be increased. In this case, a lithium oxide is generated in the discharge process. The lithium oxide can be confined by the trap portion.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a schematic cross-sectional view of a metal oxide trapped by the cathode in the air secondary battery of the third embodiment;

FIG. 14 is a graph showing charge capacity retention, as a function of cycle number, of the air batteries having the stacked cathode, the large-pore-sized cathode and the small-pore-sized cathode.

DESCRIPTION OF THE PREFERRED EMBODIMENTS

Figure 1:
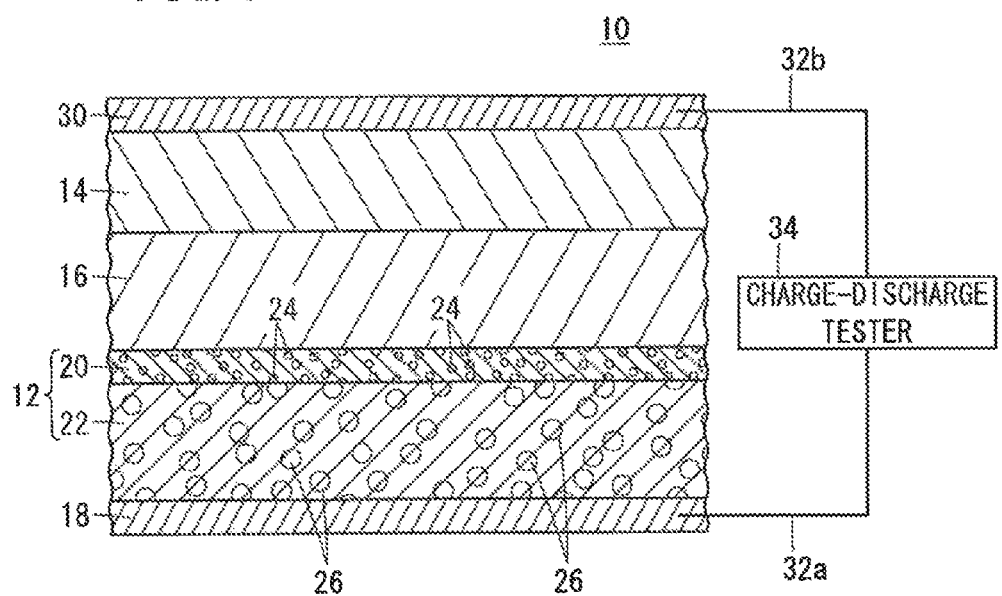
FIG. 1 is a schematic cross-sectional view of an air secondary battery according to a first embodiment of the present invention taken along the thickness direction.

Several preferred embodiments of the air secondary battery of the present invention will be described in detail below with reference to the accompanying drawings. The scale sizes of components shown in the drawings do not necessarily correspond to the actual sizes.

FIG. 1 is a schematic cross-sectional view of an air secondary battery 10 according to a first embodiment taken along the thickness direction. The air secondary battery 10 has a cathode 12, an anode 14 containing metallic lithium as an active metal material, and an electrolyte 16 interposed between the electrodes 12, 14.

The cathode 12 is disposed on one surface of a first collector 18. For example, the first collector 18 contains a metal having excellent conductivity such as aluminum, copper, or an alloy thereof.

In the first embodiment, the cathode 12 has a first cathode layer 20 located adjacent to the electrolyte 16, and further has a second cathode layer 22 located adjacent to the first cathode layer 20. Therefore, the cathode 12 is a stack of the first cathode layer 20 and the second cathode layer 22 formed in this order on the electrolyte 16. Thus, in this case, the second cathode layer 22 is separated from the electrolyte 16 at a distance corresponding to the thickness of the first cathode layer 20.

The first cathode layer 20 and the second cathode layer 22 are porous bodies. Thus, in each of the first cathode layer 20 and the second cathode layer 22, small pores 24 and large pores 26 are continuous with each other to form a three-dimensional network structure. Though the small pores 24 and the large pores 26 are each shown as an independent closed pore in FIG. 1 to facilitate understanding, the small pores 24 and the large pores 26 are actually open pores connected to form the three-dimensional network structures. Similarly, also pores shown in the other drawings are open pores.

The average pore diameter of the large pores 26 in the second cathode layer 22 is larger than the average pore diameter of the small pores 24 in the first cathode layer 20. For example, the average pore diameter of the small pores 24 may be less than 100 nm, while the average pore diameter of the large pores 26 may be more than 100 nm. For example, the average pore diameters of the small pores 24 and the large pores 26 can be measured by a known method such as a mercury intrusion method.

As described hereinafter, an oxygen-containing gas is supplied to the cathode 12 in the discharge process. Therefore, in the cathode 12, oxygen in the oxygen-containing gas is reduced in an oxygen reduction reaction. Specifically, the metal in the active material in the anode 14 is bonded to the oxygen, resulting in generation of a metal oxide. In the first embodiment, since the lithium is used as the active material in the anode 14, a lithium oxide is generated as the metal oxide in the cathode 12.

In the cathode 12, the potential of the oxygen reduction reaction in the second cathode layer 22 is higher than the potential of the oxygen reduction reaction in the first cathode layer 20. Therefore, the oxygen reduction reaction is caused and proceeds more preferentially in the second cathode layer 22 than in the first cathode layer 20. Thus, the metal oxide (the lithium oxide) is generated mainly in the second cathode layer 22, and is trapped by the first cathode layer 20 having the smaller average pore diameter.

For example, the first cathode layer 20 and the second cathode layer 22 may be composed of different materials, so that the oxygen reduction reaction potential of the second cathode layer 22 can be higher than that of the first cathode layer 20. In this case, specifically, the first cathode layer 20 may contain a carbon material such as a glassy carbon, and the second cathode layer 22 may contain gold (Au), platinum (Pt), etc. Alternatively, the first cathode layer 20 may contain Au, and the second cathode layer 22 may contain Pt, palladium (Pd), etc.

Particles of the above metal may be supported on an appropriate carrier such as a carbon material. For example, the first cathode layer 20 may contain a carbon material carrying Au particles, and the second cathode layer 22 may contain a carbon material carrying Pt or Pd particles.

In a case where the first cathode layer 20 and the second cathode layer 22 are composed of the same material, the potentials of oxygen reduction reaction can be differentiated by modifying the surface roughnesses or the plain orientations of the layers.

In the first embodiment, as described above, the active metal material in the anode 14 contains the metallic lithium. The anode 14 (the metallic lithium) is supported by a second collector 30. Similarly to the first collector 18, the second collector 30 contains a metal having excellent conductivity such as aluminum, copper, or an alloy thereof.

For example, the electrolyte 16, which is interposed between the cathode 12 and the anode 14, may contain a polymer film having an electrolyte solution or only the electrolyte solution. The electrolyte solution can be prepared by dissolving an electrolyte salt in a solvent. In this embodiment, the electrolyte salt may be, for example, a lithium salt such as LiPF$_6$, LiBF$_4$, LiClO$_4$, LiAsF$_6$, or LiTFSI to obtain lithium ion conductivity. The solvent for dissolving the lithium salt may be, for example, ethylene carbonate, propylene carbonate, dimethyl carbonate, diethyl carbonate, ethyl methyl carbonate, ethyl carbonate, butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran, dimethylsulfoxide, diglyme, triethylene glycol dimethyl ether, etc. The solvent may be a mixed solvent containing two or more of these solvents.

The cathode 12, the anode 14, and the electrolyte 16 having the above structures are placed in a casing (not shown). A supply hole for supplying the oxygen-containing gas (preferably air) to the cathode 12 is formed on the casing.

The air secondary battery 10 of the embodiment has the above-described basic structure. Operations and advantageous effects of the air secondary battery 10 will be described below.

In a discharge process of the air secondary battery 10, the first collector 18 and the second collector 30 are electrically connected to an external circuit by conductive wires 32a, 32b. In the first embodiment, a charge-discharge tester 34 is used as the external circuit.

Then, the oxygen-containing gas such as air is supplied from the supply hole on the casing to the cathode 12. The oxygen-containing gas is introduced into the second cathode layer 22 and then diffused through the large pores 26. As described above, the second cathode layer 22 has an oxygen reduction reaction potential higher than that of the first cathode layer 20. Therefore, the oxygen in the oxygen-containing gas is used in the electrode reaction preferentially in the second cathode layer 22.

In the electrode reaction on the cathode 12, the oxygen molecules in the oxygen-containing gas are bonded to the lithium ions generated on the anode 14, whereby the oxygen molecules are reduced. Specifically, on the anode 14, the metallic lithium is ionized to generate lithium ions and electrons (e$^-$). Thus, a reaction proceeds as represented by the following reaction formula (A).

$$\text{Li} \rightarrow \text{Li}^+ + e^- \quad \text{(A)}$$

Since the electrolyte 16 has the lithium ion conductivity, the generated lithium ions are transferred through the electrolyte 16 toward the cathode 12. The lithium ions are bonded to the oxygen in the second cathode layer 22, and thus the oxygen is reduced. This oxygen reduction reaction is represented by the following reaction formula (B) or (C).

$$2(\text{Li}^+ + e^-) + \text{O}_2 \rightarrow \text{Li}_2\text{O}_2 \quad \text{(B)}$$

$$4(\text{Li}^+ + e^-) + \text{O}_2 \rightarrow 2\text{Li}_2\text{O} \quad \text{(C)}$$

As is clear from the formula, in the air secondary battery 10 using the metallic lithium as the anode active material, lithium oxide particles are generated in the second cathode layer 22 in the discharge process. As a result of in-situ observation using a transmission electron microscope (TEM), the inventors have confirmed that the average particle diameter of the lithium oxide particles is generally within a range of 100 to 500 nm.

In conventional lithium-air batteries, as is clear from in-situ observation using the TEM, lithium oxide particles generated in the discharge process may be detached from the cathode and may be transferred to the electrolyte 16 in the charge process. The reasons for this are assumed as described below.

That is, as shown by the reaction formula (B') or (C') to be described later, the lithium oxide is reduced to generate lithium ions and oxygen molecules in the charge process. This reduction reaction is caused by withdrawal of electrons at the contact point between the cathode and the lithium oxide. Particles of the metal oxide as solid shrink and reduce the contact area (electric contact) with the cathode. It is assumed that as the charge process further proceeds, the particles of the lithium oxide lose contact with the cathode and eventually fall off from the surface of the cathode.

The detached particles of the lithium oxide cannot contribute the electrochemical reaction with the electrodes as shown by the reaction formula (B') or (C') any longer. Therefore, the detached particles of the lithium oxide cannot be converted to the lithium ions, failing to be deposited as the metallic lithium on the anode again. For this reason, the detached particles of the lithium oxide are rendered unavailable to contribute to reactions in the subsequent charge and discharge processes. It is assumed that the charge and discharge capacities deteriorate for the foregoing reasons.

Further, since the contact area decreases as mentioned above, electric resistance at the contact point increases and charge efficiency is lowered. In other words, the rate of the electrode reaction in the charge process becomes low.

In this case, the electric contact between the electrolyte 16 and the first cathode layer 20 (the cathode 12) may be deteriorated. Even when a charge process is carried out to reduce the lithium oxide to the metallic lithium, the particles detached from the cathode cannot be deposited in the form of the metallic lithium on the anode 14. For the reasons, the charge and discharge capacities may be lowered.

Therefore, in the first embodiment, the first cathode layer 20 and the second cathode layer 22 have different oxygen reduction reaction potentials and different average pore diameters. Thus, as described above, the second cathode layer 22 has the higher oxygen reduction reaction potential, and the pores (the small pores 24) in the first cathode layer 20 have the smaller average pore diameter. In addition, the average pore diameter of the small pores 24 in the first cathode layer 20 is preferably less than 100 nm.

Consequently, in a case where the lithium oxide particles generated preferentially in the second cathode layer 22 fall off, the particles can be trapped by the small pores 24 in the first cathode layer 20. Thus, even when the lithium oxide is detached from the second cathode layer 22, the lithium oxide can be trapped by the first cathode layer 20. As a result, the lithium oxide can be confined in the cathode 12.

When a predetermined time has elapsed after the start of the discharge process or when the discharge voltage is lowered to a predetermined threshold value, a charge process is carried out. In this process, the lithium oxide is reduced to generate lithium ions and oxygen molecules. Thus, in the cathode 12, a reverse reaction of the above reaction represented by the reaction formula (B) or (C), i.e. a metal reduction reaction represented by the following reaction formula (B') or (C'), proceeds to generate oxygen.

$$Li_2O_2 \rightarrow 2(Li^+ + e^-) + O_2 \quad (B')$$

$$2Li_2O \rightarrow 4(Li^+ + e^-) + O_2 \quad (C')$$

The generated oxygen flows through the first cathode layer 20 or the second cathode layer 22, and is discharged from the supply hole to the outside of the casing. Meanwhile, the lithium ions are transported through the electrolyte 16 and reach the anode 14. Then, the lithium ions are bonded with electrons and therefore reduced to generate metallic lithium on the anode 14, whereby the metallic lithium is deposited on the anode 14 again.

As described above, the lithium oxide is confined in the cathode 12 (particularly in the first cathode layer 20). Therefore, the metallic lithium can be efficiently regenerated as a reduced product from the lithium oxide on the anode 14. Meanwhile, the confinement of the lithium oxide by the first cathode layer 20 prevents the lithium oxide from moving toward the electrolyte 16. Therefore, the electric contact between the electrolyte 16 and the first cathode layer 20 (the cathode 12) can be recovered and thus maintained. For the reasons, sufficient charge and discharge capacities can be maintained.

As described above, the lithium oxide is generated preferentially in the second cathode layer 22 in the cathode 12, and the lithium oxide is trapped by the first cathode layer 20. Consequently, the air secondary battery 10 can exhibit sufficient charge and discharge capacities.

In addition, since the lithium oxide is confined in the cathode 12, the electric contact between the lithium oxide and the cathode 12 can be recovered and the contact area between the lithium oxide and the cathode 12 can also be recovered. Thus, the overpotential can be reduced. As a result of the recovery of the contact area, because electrical resistance at the contact point can be kept low, the rate of the electrode reaction can be improved. Consequently, the air secondary battery 10 can exhibit the large discharge and charge capacities and the low overpotential, i.e. improved properties.

For example, the cathode 12 in the air secondary battery 10 can be prepared in the following manner. First, a known foaming agent (such as a resin) is mixed with a powder of a metal such as Au to form the first cathode layer 20. Meanwhile, a foaming agent may be mixed with a powder of a metal such as Pt or Pd to form the second cathode layer 22.

In this step, the average pore diameters of the first cathode layer 20 and the second cathode layer 22 can be controlled respectively by selecting the average particle diameters of the foaming agents. Thus, the average particle diameter of the foaming agent to be added to the metal powder for the second cathode layer 22 may be larger than that of the foaming agent to be added to the metal powder for the first cathode layer 20, and mixture powders may be prepared using the foaming agents. The porosities of the first cathode layer 20 and the second cathode layer 22 can be controlled respectively by selecting the amount of the foaming agents.

The mixture powders are formed into predetermined shapes, stacked, and burned. As a result, the cathode 12 containing the stack of the first cathode layer 20 and the second cathode layer 22 is obtained as the burned product. Alternatively, the first cathode layer 20 and the second cathode layer 22 may be separately prepared and then bonded to obtain the cathode 12.

In the firing step, the foaming agents in the formed stack are vaporized and discharged to the outside. The small pores 24 and the large pores 26 are formed in the first cathode layer 20 and the second cathode layer 22 in this manner respectively. The small pores 24 and the large pores 26 have average pore diameters approximately corresponding to the average particle diameters of the foaming agents respectively.

Figure 2:
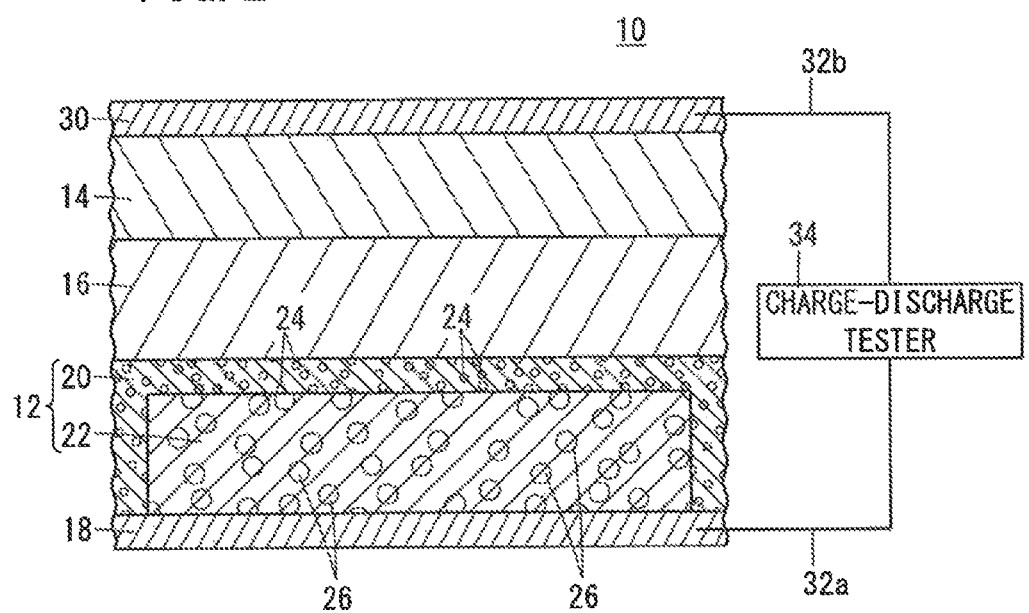
FIG. 2 is a schematic cross-sectional view of an air secondary battery according to a modification example of the first embodiment taken along the thickness direction.

Though the first cathode layer 20 is stacked on the second cathode layer 22 (on a surface thereof facing the electrolyte 16) in the example of FIG. 1, the major portion of the second cathode layer 22 (the surface thereof facing the electrolyte 16 and side surfaces thereof extending from the surface facing the electrolyte 16 toward a surface facing the first current collector 18) may be surrounded by the first cathode layer 20 as shown in FIG. 2. In this case, the first collector 18 may be brought into electrical contact with a portion of the second cathode layer 22 exposed from the first cathode layer 20.

An air secondary battery 40 according to a second embodiment will be described below with reference to FIG. 3. The same components are marked with the same numerals in FIGS. 1 to 3, and detailed explanations thereof are omitted.

A cathode 42 in the air secondary battery 40 has the first cathode layer 20 and the second cathode layer 22, similarly to the cathode 12 of the first embodiment. The cathode 42 further has an insulating layer 44 interposed between the first cathode layer 20 and the second cathode layer 22.

For example, the insulating layer 44 contains a polymer material. Preferred specific examples of the polymer materials include porous polymethylmethacrylic acids (PMMA). The average pore diameter of the insulating layer 44 may be 100 to 500 nm.

In this case, the insulating layer 44 may be formed in the following manner. First, a hydrochloric acid (HCl) solution of tetraorthosilicate is mixed with a tetrahydrofuran solution of PMMA, and the resultant mixture liquid is vacuum-dried to obtain a composite of the PMMA and silica ($SiO_2$). In this step, $SiO_2$ is in the form of particles dispersed in the PMMA.

Then, an etching step is carried out using hydrofluoric acid. Hydrofluoric acid attacks $SiO_2$ and does not attack the PMMA. Therefore, only $SiO_2$ is removed, and pores are formed in the positions corresponding to the removed $SiO_2$. Thus, a porous PMMA is obtained in this step. This process is described in detail in J-P. Lee, et al., Nanoscale Res. Lett., 2012, vol. 7, page 440.

The porous PMMA is placed between the first cathode layer 20 and the second cathode layer 22 formed in the above manner, and the three layers are bonded to obtain the cathode 42 having the insulating layer 44.

In a discharge process of the air secondary battery 40, the first collector 18 and the second collector 30 are electrically connected to the charge-discharge tester 34 by the conductive wires 32a, 32b. In the second embodiment, a branch wire 32c extends from the conductive wire 32a. The branch wire 32c is electrically connected to the first cathode layer 20, and a switch 46 is formed on the branch wire 32c.

The switch 46 is opened, and the oxygen-containing gas such as air is supplied from the supply hole on the casing only to the second cathode layer 22 in the cathode 42. Then, the binding reaction of the lithium ions derived from the anode 14 (the metallic lithium) with the oxygen molecules proceeds in the second cathode layer 22. Thus, the above oxygen reduction reaction represented by the reaction formula (B) or (C) is carried out.

In the second embodiment, the insulating layer 44 is interposed between the second cathode layer 22 and the first cathode layer 20. Therefore, electron transfer can be prevented between the second cathode layer 22 and the first cathode layer 20. The switch 46 is opened, whereby the anode 14 and the first cathode layer 20 are insulated. Therefore, electron transfer can be prevented also between the anode 14 and the first cathode layer 20.

In addition, the oxygen reduction reaction potential of the second cathode layer 22 is higher than that of the first cathode layer 20. For these reasons, the oxygen reduction reaction is hardly caused in the first cathode layer 20. In other words, the oxygen reduction reaction can be caused and carried out only in the second cathode layer 22. Therefore, the generation of the lithium oxide particles can be prevented in the first cathode layer 20.

Consequently, in the second embodiment, the electrode reaction can be carried out more preferentially in the second cathode layer 22. Thus, the precedence of the electrode reaction can be further yielded.

In a case where the lithium oxide particles generated in the second cathode layer 22 fall off from the second cathode layer 22 in the discharge process, the particles are transferred through the pores in the insulating layer 44 and trapped by the pores in the first cathode layer 20. This is because the average pore diameter of the small pores 24 in the first cathode layer 20 is smaller than the average particle diameter of the particles as described above.

When a predetermined time has elapsed after the start of the discharge process or when the discharge voltage is lowered to a predetermined threshold value, a charge process is carried out. In this process, the switch 46 is closed, whereby the anode 14 and the first cathode layer 20 are electrically connected by the charge-discharge tester 34.

The lithium oxide molecules trapped by the first cathode layer 20 and the lithium oxide molecules retained in the second cathode layer 22 are reduced in the charge process. Thus, the metal reduction reaction represented by the reaction formula (B') or (C') proceeds to generate oxygen. The generated oxygen flows in the first cathode layer 20 or the second cathode layer 22, and is discharged through the supply hole to the outside of the casing. Meanwhile, the lithium ions are transferred through the electrolyte 16 to the anode 14 and are bonded with electrons on the anode 14. Thus, the lithium ions are reduced, and the metallic lithium is regenerated on the anode 14.

In the case of using the switch 46, the flow passage can be appropriately changed in the discharge process and the charge process. Thus, the electrode reaction can be carried out preferentially in the second cathode layer 22 in the discharge process, and the lithium oxide can be reduced in both of the first cathode layer 20 and the second cathode layer 22 in the charge process.

Similarly to the air secondary battery 10 of the first embodiment, also the air secondary battery 40 of the second embodiment can exhibit sufficient charge and discharge capacities and lowered overpotential.

Figure 3:
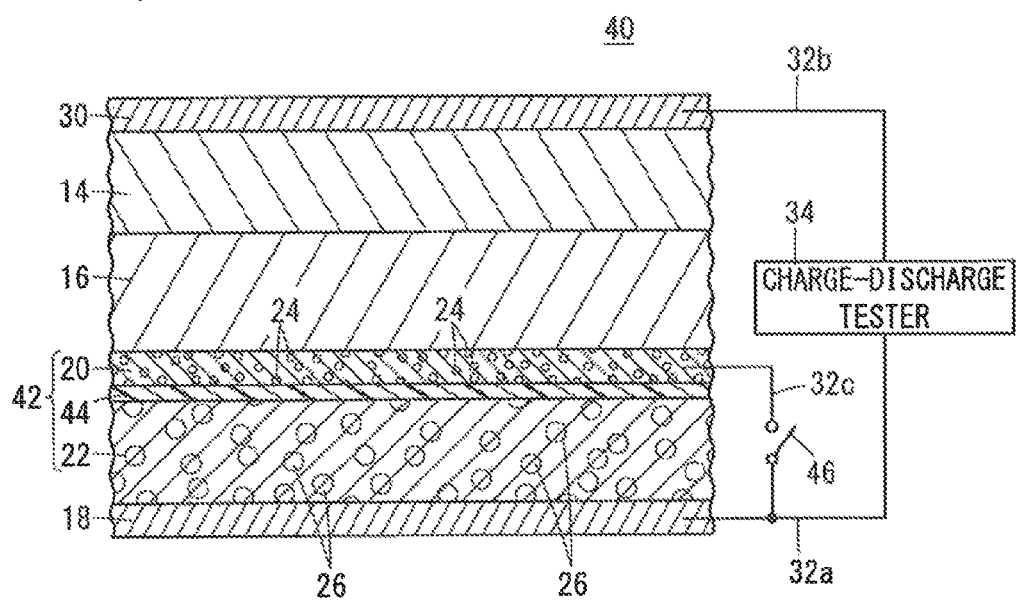
FIG. 3 is a schematic cross-sectional view of an air secondary battery according to a second embodiment taken along the thickness direction.
Figure 4:
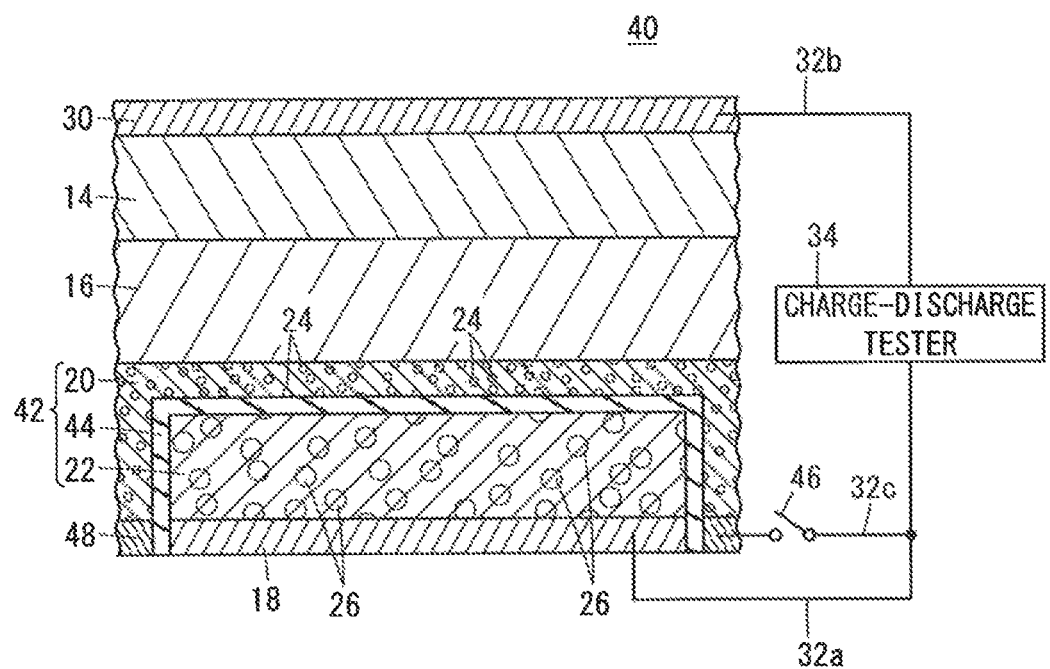
FIG. 4 is a schematic cross-sectional view of an air secondary battery according to a modification example of the second embodiment taken along the thickness direction.
Figure 5:
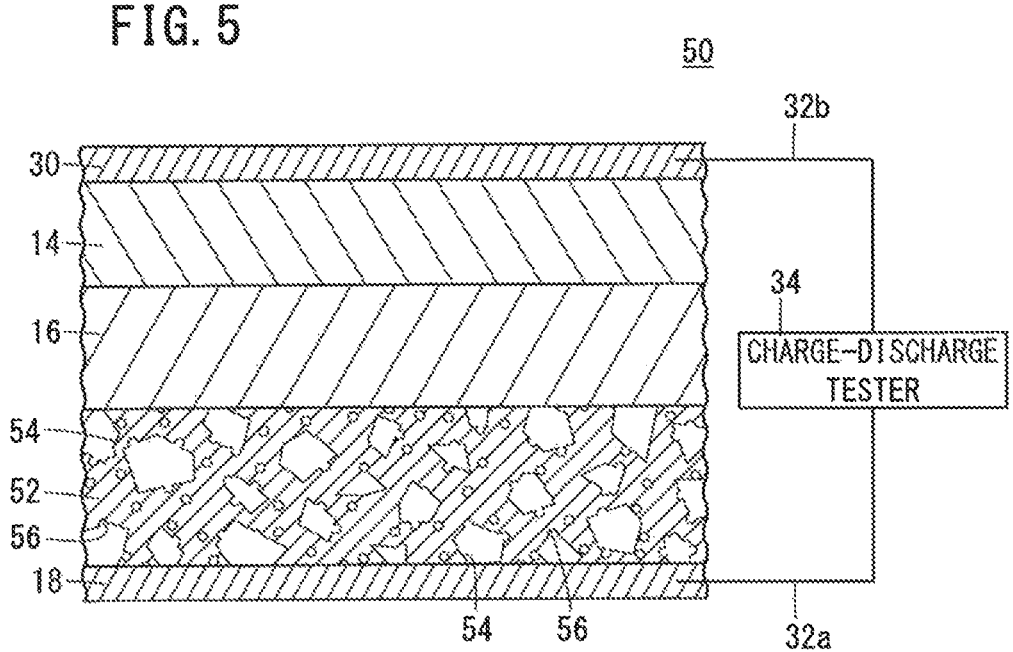
FIG. 5 is a schematic cross-sectional view of an air secondary battery according to a third embodiment taken along the thickness direction.

Though the first cathode layer 20 is stacked on the second cathode layer 22 (on the surface thereof facing the electrolyte 16) in the example of FIG. 3, the major portion of the second cathode layer 22 (the surface thereof facing the electrolyte 16 and side surfaces thereof extending from the surface facing the electrolyte 16 toward the surface facing the first current collector 18) may be surrounded by the first cathode layer 20 as shown in FIG. 4. In this case, the first collector 18 may be brought into electrical contact with a portion of the second cathode layer 22 exposed from the first cathode layer 20 and the insulating layer 44.

In this structure, a third collector 48 for supporting the first cathode layer 20 is formed in addition to the first collector 18, and the insulating layer 44 is interposed also between the first collector 18 and the third collector 48. The third collector 48 may be electrically connected to the charge-discharge tester 34 via the branch wire 32c having the switch 46.

The insulating layer 44 may simply be a gap. In this case, the first cathode layer 20 and the second cathode layer 22 may be separated from each other at a predetermined distance.

An air secondary battery 50 according to a third embodiment will be described below with reference to FIGS. 5 to 8. The same components are marked with the same numerals in FIGS. 1 to 8, and detailed explanations thereof are omitted.

Figure 6:
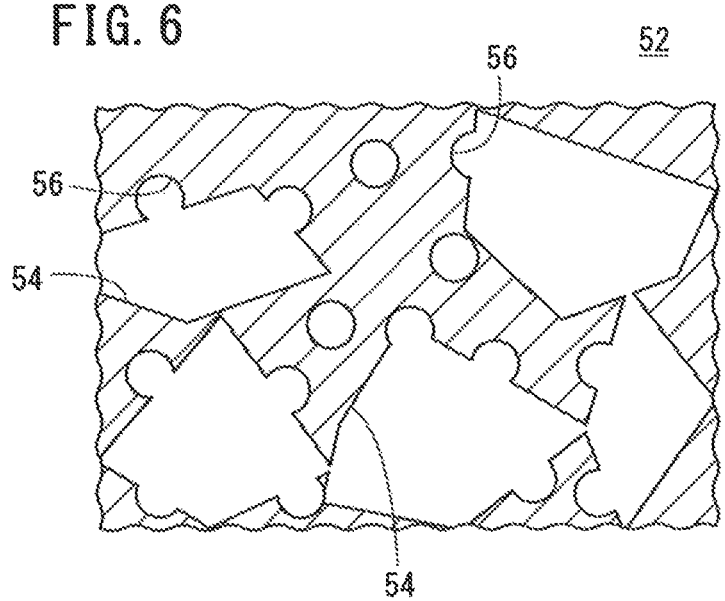
FIG. 6 is a schematic cross-sectional view of a cathode in the air secondary battery of the third embodiment taken along the thickness direction.

The air secondary battery 50 has a cathode 52, the anode 14, and the electrolyte 16 interposed between the cathode 52 and the anode 14. As shown in FIG. 6, the cathode 52 is a porous body having pores 54 inside. For example, the cathode 52 may contain gold (a porous gold material). Though the pores 54 are each shown as an independent closed pore in FIG. 6 to facilitate understanding, the pores 54 are actually open pores connected to form a three-dimensional network structure.

One or more dimples 56 are continuous with each pore 54. The volume of each dimple 56 is smaller than that of the pore 54. The dimples 56 are connected only with the pores 54. The cathode 52 may further have an isolated dimple 56 not connected to the pores 54.

An opening of the dimple 56 is continuous with the pore 54, and the opening may be smaller than an inner portion of the dimple 56. It is not necessary that all the dimples 56 have such smaller openings. At least 50% of the dimples 56 continuous with the pores 54 may have such small openings.

The other components including the anode 14 and the electrolyte 16 of the third embodiment are equal to those of the first and second embodiments, and therefore detailed explanations thereof are omitted.

Also in the air secondary battery 50 of the third embodiment, the oxygen-containing gas such as air is supplied from the supply hole on the casing to the cathode 52 in the discharge process. The oxygen-containing gas flows in the pores 54 in the cathode 52.

The lithium ions generated on the anode 14 are bonded to the oxygen molecules in the oxygen-containing gas in the cathode 52, whereby the oxygen reduction reaction represented by the reaction formula (B) or (C) is carried out. Since the oxygen-containing gas flows in the pores 54 in the cathode 52, the inner walls of the pores 54 in the cathode 52 act as a reaction field.

In the oxygen reduction reaction, the lithium oxide particles are generated in the pores 54 (on the inner walls of the pores 54) in the cathode 52. This is because the inner walls of the pores 54 act as the reaction field as described above.

The pores 54 have the dimples 56 connected therewith. The oxygen-containing gas is introduced also into the dimples 56. Thus, also the inner walls of the dimples 56 act as the reaction field. Therefore, as shown in FIG. 7, a portion of a lithium oxide particle 58 is introduced into the dimple 56, the residue is exposed from the dimple 56, and the lithium oxide particle 58 is grown and protrudes toward the pore 54.

As described above, in the dimple 56, the width of the opening connected with the pore 54 is smaller than that of the inner portion. Therefore, the lithium oxide particle 58 grown in the dimple 56 is hardly separated from the dimple 56. Thus, the dimple 56 has an excellent anchor effect. In other words, in this case, the dimples 56 catch the lithium oxide particle 58 partially introduced into the dimple 56, so that the lithium oxide can be easily confined in the cathode 52.

When a predetermined time has elapsed after the start of the discharge process or when the discharge voltage is lowered to a predetermined threshold value, a charge process is carried out. In this process, in the cathode 52, the lithium oxide trapped by the dimples 56 is reduced to generate lithium ions and oxygen molecules. Thus, the metal reduction reaction represented by the reaction formula (B') or (C') proceeds to generate oxygen. The generated oxygen flows in the first cathode layer 20 or the second cathode layer 22, and is discharged through the supply hole to the outside of the casing. Meanwhile, the lithium ions are transferred through the electrolyte 16 to the anode 14 and are bonded with electrons on the anode 14. Thus, the lithium ions are reduced, and the metallic lithium is regenerated on the anode 14.

Since the lithium oxide is confined in the cathode 52 as described above, the metallic lithium can be efficiently regenerated as a reduced product from the lithium oxide on the anode 14. Furthermore, the lithium oxide is trapped by the cathode 52, and thereby is prevented from moving toward the electrolyte 16. Therefore, the electric contact between the electrolyte 16 and the cathode 52 can be maintained. For the reasons, also in the third embodiment, sufficient charge and discharge capacities can be maintained.

In addition, since the lithium oxide is confined in the cathode 52, the electric contact between the lithium oxide and the cathode 52 can be recovered and the contact area between the lithium oxide and the cathode 52 can also be recovered in the cathode. Thus, the overpotential can be lowered. As a result of the recovery of the contact area, because electrical resistance at the contact point can be kept low, the rate of the electrode reaction can be improved. Consequently, also in the third embodiment, the air secondary battery 50 can exhibit the large discharge and charge capacities and the low overpotential, i.e., an improved performance.

Figure 8A:
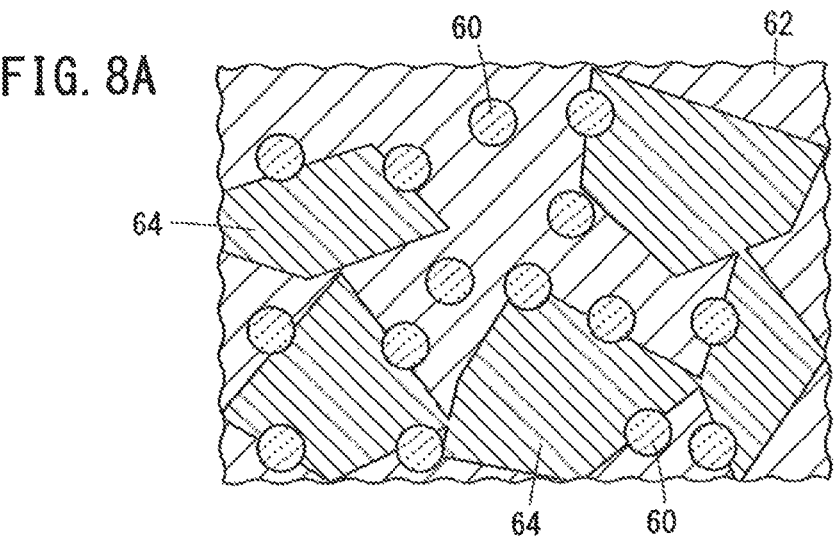
FIGS. 8A to 8C are schematic flow diagrams illustrating a method for preparing the cathode in the air secondary battery of the third embodiment.

For example, the cathode 52 in the air secondary battery 50 can be prepared in the following manner. As shown in FIG. 8A, a gold-silver alloy is prepared in the same manner as a method described in J. Biener, et al., J. Appl. Phys., vol. 97, pp. 024301-1-024301-4 (2004), except that fine ceramic particles 60 of $Al_2O_3$, $SiO_2$, or the like are added and dispersed in the alloy. The gold and silver do not form an intermetallic compound, and the gold-silver alloy contains gold phases 62 and silver phases 64 in a phase separation state.

Figure 8B:
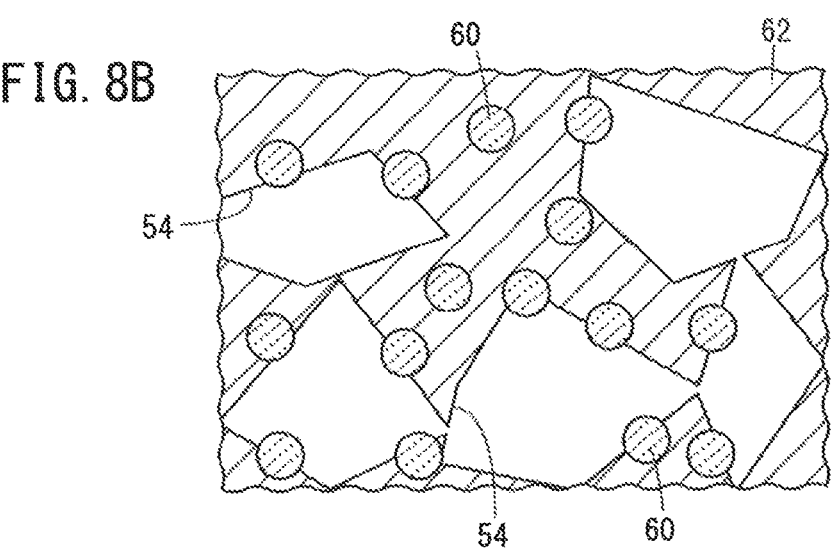

The silver phases 64 are removed from the gold-silver alloy by electrochemical etching. The pores 54 are formed in positions corresponding to the removed silver phases 64. In this step, the fine ceramic particles 60 are not removed, and remain in the gold phases 62. Thus, as shown in FIG. 8B, the gold-silver alloy is converted by the electrochemical etching to a porous gold (the gold phases 62) containing the fine ceramic particles 60 dispersed.

Figure 8C:
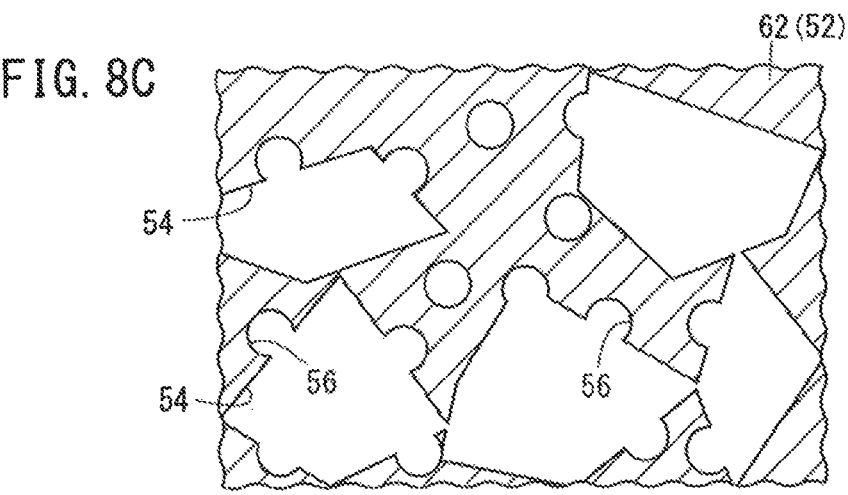

Then, the fine ceramic particles 60 are removed. For this purpose, the porous gold may be immersed in a predetermined solvent such as nitric acid ($HNO_3$). The fine ceramic particles 60 are dissolved in the solvent, whereby a porous gold (the gold phases 62) shown in FIG. 8C is obtained. The porous gold can be used as the cathode 52.

It is to be understood that the present invention is not limited to the above first to third embodiments, and various changes and modifications may be made therein without departing from the scope of the invention.

For example, though the metallic lithium is used as the anode active material in the above first to third embodiments, a lithium alloy may be used instead of the metallic lithium. The anode active material is not limited to a lithium material for generating the lithium ions such as the metallic lithium or the lithium alloy, and may contain another metal such as magnesium, aluminum, zinc, sodium, iron, calcium, potassium, or an alloy thereof.

In the discharge process, the air secondary battery 10, 40, 50 may be electrically connected to a predetermined external load instead of the charge-discharge tester 34.

Example

Figure 9:
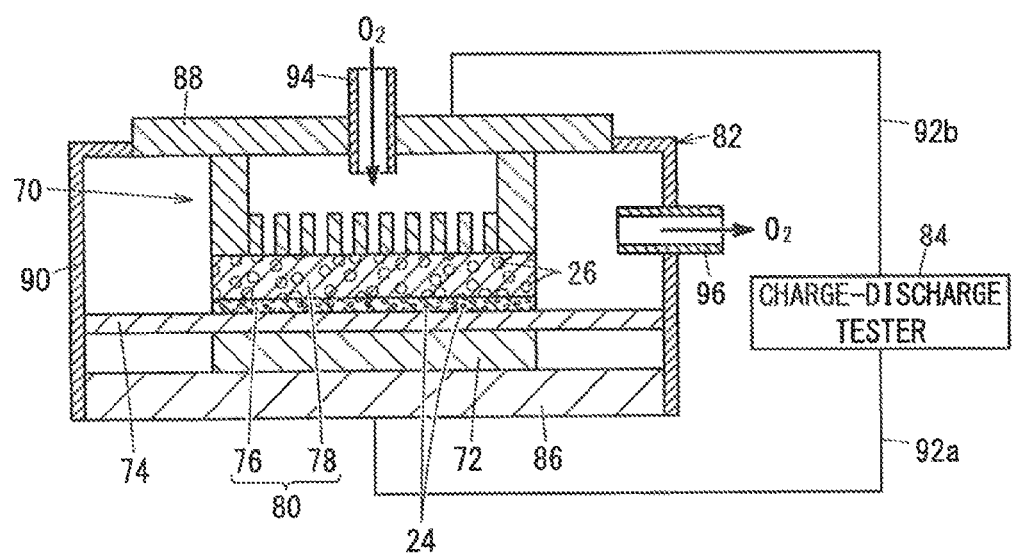
FIG. 9 is a schematic cross-sectional view of an air battery incorporated into a gas flow electrochemical cell, the air battery having a stacked cathode formed by stacking a porous cathode with smaller pores and a porous cathode with larger pores.

As shown in FIG. 9, an air battery 70 was formed by an anode 72 of metallic lithium, a separator 74 soaked with an electrolyte of LiTFSI/triethylene glycol dimethyl ether (TEGDME) having a concentration of 1 mol/L, and a stacked cathode 80 of two sheets of porous graphite oxide paper having different average pore sizes, i.e., a small-pore-sized cathode 76 and a large-pore-sized cathode 78 stacked one another. The air battery 70 was incorporated into a Mikromasch gas flow electrochemical cell 82 and electrically connected to a charge-discharge tester 84.

The gas flow electrochemical cell 82 included an anode current collector 86 electrically connected to the anode 72, a cathode current collector 88 electrically connected to the stacked cathode 80, and a casing 90 housing the air battery 70. The charge-discharge tester 84 was electrically connected to the anode current collector 86 and the cathode current collector 88 via conductive wires 92a, 92b, respectively. In the discharge process, oxygen was introduced through a supply pipe 94 of the cathode current collector 88, and released through an exhaust pipe 96 of the casing 90.

The production process of the stacked cathode 80 will be explained. A pyrrole (PY)-formaldehyde (FA) solution was first prepared, and then mixed with a graphene oxide (GO) aqueous dispersion. While the mixed liquid was subjected to sonication for 30 minutes, a gel was prepared by in-situ polymerization of the formaldehyde and pyrrole. The gel was placed at the room temperature for 24 hours to form a hydrogel.

Next, the hydrogel was drop-casted in a Petri dish having a diameter of 6 cm, left at rest and frozen at −80° C. for 2 hours, and then freeze-dried for 24 hours under vacuum. The resultant porous graphite oxide paper was reduced under a 5% $H_2$/Ar atmosphere. A porous cathode was thus obtained. In the case where the ratio of GO to PY was controlled at GO:PY=1:3 (mass ratio, the same applies hereinafter) and the porous graphite oxide paper was reduced at 800° C. for 4 hours, the pore size of the resultant porous cathode was less than 100 nm, the specific surface area was 238 $m^2$/g, and the particle size was 25.2 nm.

In the case where the ratio of GO to PY was controlled at GO:PY=1:5 and the porous graphite oxide paper was reduced at 1000° C. for 4 hours, the pore size of the resultant porous cathode was greater than 1 μm, the specific surface area was 69.1 $m^2$/g, and the particle size was 86.8 nm.

Each of the above-mentioned two types of porous graphite oxide paper (GO-PY sheets) was cut into a disk with a diameter of 1 cm to be used as the cathode. The cathode of the GO-PY sheet having the smaller pore size with the ratio of GO:PY=1:3 will be referred to as "small-pore-sized cathode 76", and the cathode of the GO-PY sheet having the larger pore size with the ratio of GO:PY=1:5 will be referred to as "large-pore-sized cathode 78", hereinafter. The stacked cathode 80 was formed by stacking the small-pore-sized cathode 76 and the large-pore-sized cathode 78 one another, and was so oriented that the small-pore-sized cathode 76 was positioned closer to the separator 74 soaked with the electrolyte than the large-pore-sized cathode 78.

An electrochemical test was conducted at the current density of 0.1 mA/$cm^2$ with respect to an air battery having the stacked cathode. The cutoff voltage was 2.0 V (vs. Li/$Li^+$, the same applies hereinafter) for discharge, and 4.5 V for charge. For comparison, electrochemical tests were also conducted with respect to an air battery 70 having the large-pore-sized cathode only and an air battery 70 having the small-pore-sized cathode only, under the same conditions as the air battery 70 having the stacked cathode 80.

Figure 10:
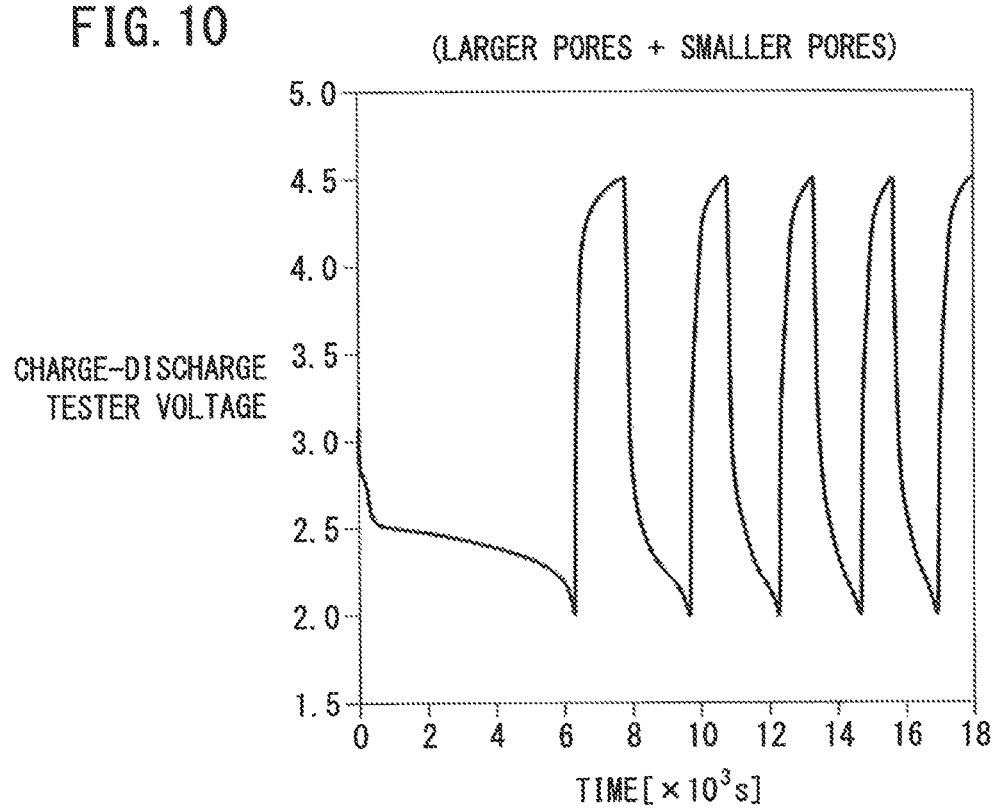
FIG. 10 is a charge/discharge curve of the air battery which has the stacked cathode.
Figure 11:
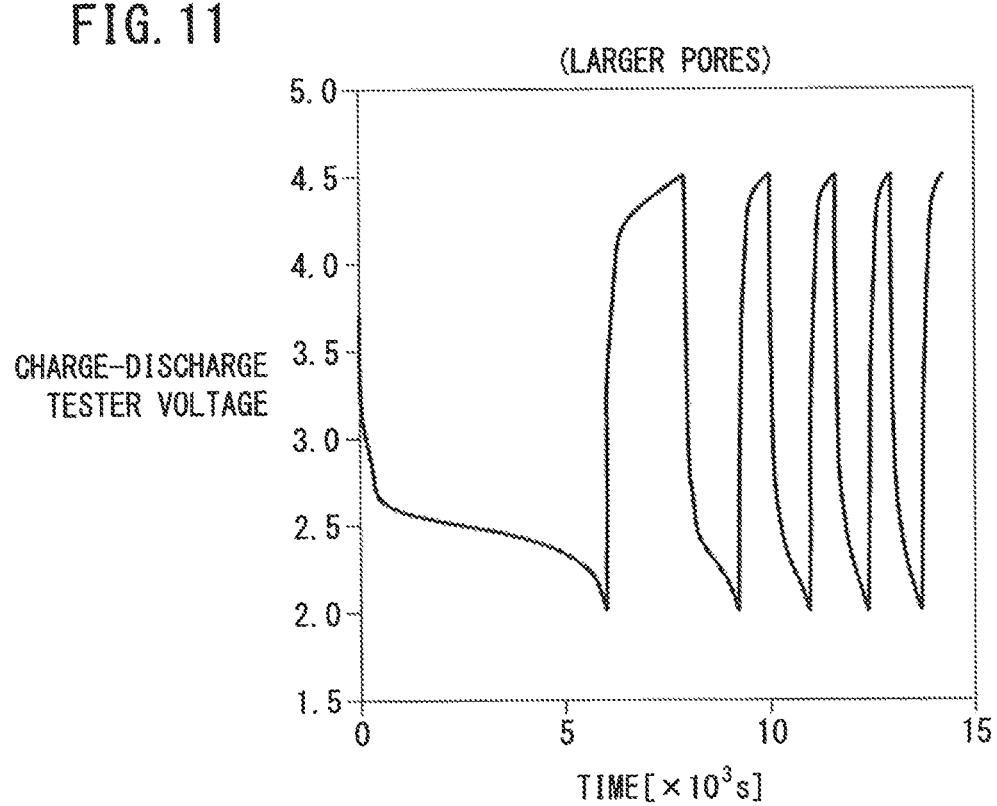
FIG. 11 is a charge/discharge curve of the air battery which has the large-pore-sized cathode.
Figure 12:
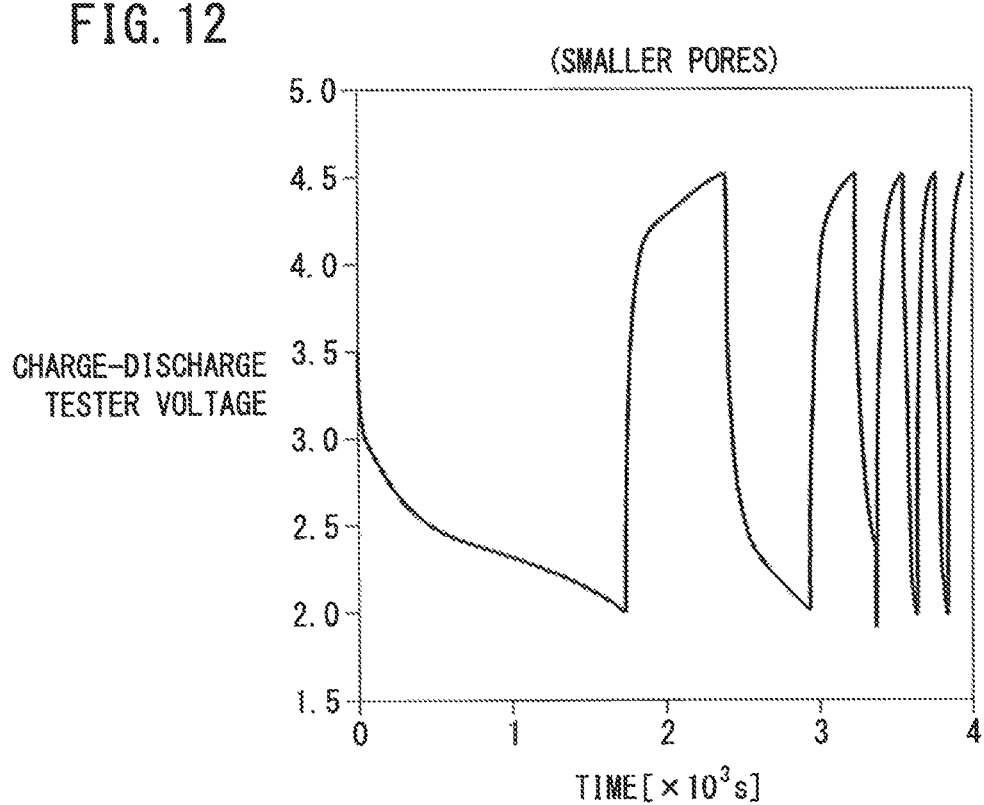
FIG. 12 is a charge/discharge curve of the air battery which has the small-pore-sized cathode.
Figure 13:
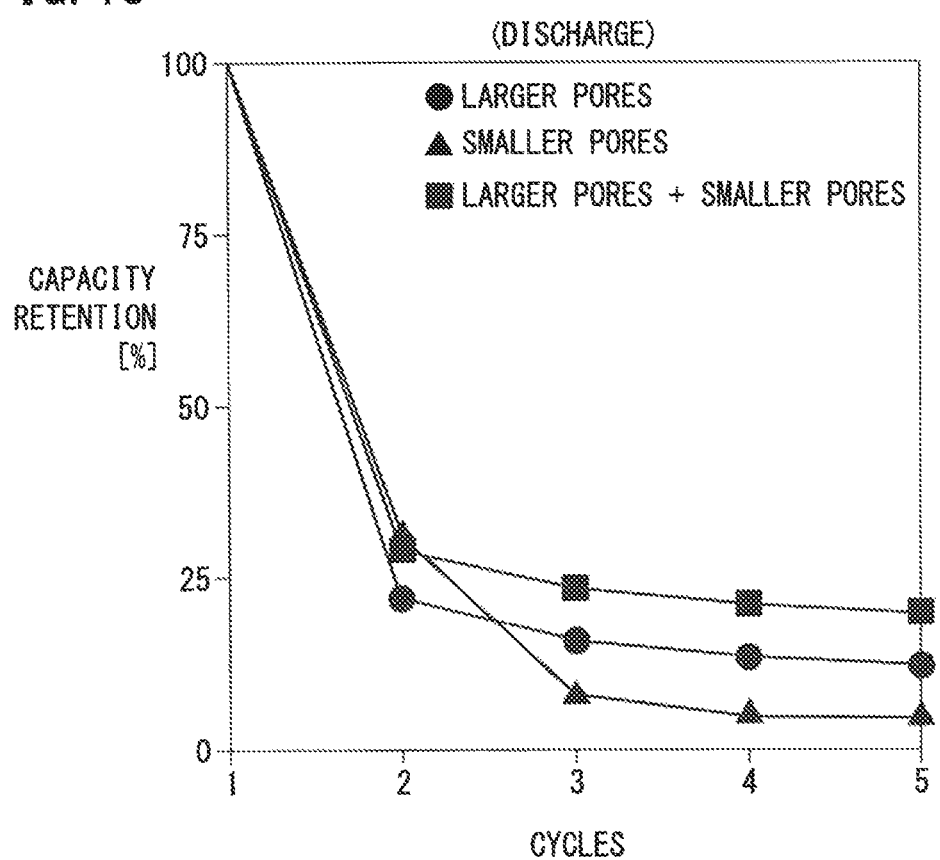
FIG. 13 is a graph showing discharge capacity retention, as a function of cycle number, of the air batteries having one of the stacked cathode, the large-pore-sized cathode and the small-pore-sized cathode.

FIGS. 10 to 12 respectively show charge/discharge curves of the air batteries 70 having the stacked cathode 80, the large-pore-sized cathode 78, and a small-pore-sized cathode 76. Further, FIG. 13 shows a graph of retention rate of discharge capacity as a function of cycle number, and FIG. 14 shows a graph of retention rate of charge capacity as a function of cycle number. The captions, "Larger Pores+Smaller Pores", "Larger Pores" and "Smaller Pores" in FIGS. 10 to 14 respectively mean the use of the stacked cathode 80, the large-pore-sized cathode 78 alone and the small-pore-sized cathode 76 alone.

FIGS. 10 to 13 clearly show that in the case of the stacked cathode 80, 20% of the initial discharge capacity was retained after 5 cycles, while only 10% was retained in the case of the large-pore-sized cathode 78 alone, and only 5% was retained in the case of the small-pore-sized cathode 76 alone. Further, it is clear from FIGS. 10 to 12 and 14 that in the case of the stacked cathode 80, 64% of the charge capacity was maintained after 5 cycles. This retention rate is significantly higher than 28% for the large-pore-sized cathode 78 alone and 17% for the small-pore-sized cathode 76 alone.

It is considered that the charge capacity when using the stacked cathode 80 is improved because the small-pore-sized cathode 76 of the stacked cathode 80 is able to capture the detached particles, such as $Li_2O_2$ particles, which would otherwise contribute to the capacity loss. Consequently, the cyclability of the air battery is improved.

What is claimed is:

1. An air secondary battery comprising a cathode for reducing oxygen in an oxygen-containing gas in a discharge process, an anode containing an active metal material, and an electrolyte interposed between the cathode and the anode, wherein
   the cathode has a trap portion configured to confine a metal oxide generated in the cathode, in the discharge process,
   the cathode has a first cathode layer used as the trap portion in contact with the electrolyte and a second cathode layer separated from the electrolyte,
   the first cathode layer and the second cathode layer are porous bodies,
   an average pore diameter of pores in the second cathode layer is larger than an average pore diameter of pores in the first cathode layer,
   a potential of an oxygen reduction reaction in the second cathode layer is higher than a potential of an oxygen reduction reaction in the first cathode layer, and
   the second cathode layer is surrounded by the first cathode layer, with a surface of the second cathode layer facing the electrolyte and side surfaces of the second cathode layer being covered by the first cathode layer.

2. The air secondary battery according to claim 1, wherein the air secondary battery is configured such that the metal oxide is generated in the second cathode layer in the discharge process, and the metal oxide generated in the second cathode layer in the discharge process is transferred from the second cathode layer to the first cathode layer, and trapped by the pores in the first cathode layer.

3. The air secondary battery according to claim 1, wherein the average pore diameter of the first cathode layer is less than 100 nm.

4. The air secondary battery according to claim 1, wherein the active metal material in the anode contains lithium.

5. An air secondary battery comprising a cathode for reducing oxygen in an oxygen-containing gas in a discharge process, an anode containing an active metal material, and an electrolyte interposed between the cathode and the anode, wherein the cathode has a trap portion configured to confine a metal oxide generated in the cathode, in the discharge process, the cathode has a first cathode layer used as the trap portion in contact with the electrolyte and a second cathode layer separated from the electrolyte, the first cathode layer and the second cathode layer are porous bodies, an average pore diameter of pores in the second cathode layer is larger than an average pore diameter of pores in the first cathode layer, a potential of an oxygen reduction reaction in the second cathode layer is higher than a potential of an oxygen reduction reaction potential in the first cathode layer, and an insulating layer is interposed between the first cathode layer and the second cathode layer, and the insulating layer is spaced from the electrolyte by the first cathode layer.

6. The air secondary battery according to claim 5, wherein each of the first cathode layer and the second cathode layer is electrically connected to a charger independently in a charge process.

7. The air secondary battery according to claim 5, wherein the insulating layer contains a polymer material.

8. The air secondary battery according to claim 5, wherein the insulating layer is a gap.

9. The air secondary battery according to claim 5, wherein the second cathode layer is surrounded by the insulation layer, with a surface of the second cathode layer facing the electrolyte and side surfaces of the second cathode layer being covered by the insulation layer, and the insulation layer being surrounded by the first cathode layer, with a surface of the insulation layer facing the electrolyte and side surfaces of the insulation layer being covered by the first cathode layer.

10. The air secondary battery according to claim 5, wherein the air secondary battery is configured such that the metal oxide is generated in the second cathode layer in the discharge process, and the metal oxide generated in the second cathode layer in the discharge process is transferred from the second cathode layer to the first cathode layer, and trapped by the pores in the first cathode layer.

11. The air secondary battery according to claim 5, wherein the average pore diameter of the first cathode layer is less than 100 nm.

12. The air secondary battery according to claim 5, wherein the active metal material in the anode contains lithium.

* * * * *